(12) United States Patent
Hinago

(10) Patent No.: US 8,092,771 B2
(45) Date of Patent: Jan. 10, 2012

(54) NITROGEN-CONTAINING CARBON MATERIAL AND PROCESS FOR PRODUCING THE SAME

(75) Inventor: Hidenori Hinago, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 0 days.

(21) Appl. No.: 12/593,594

(22) PCT Filed: Mar. 27, 2008

(86) PCT No.: PCT/JP2008/055964
§ 371 (c)(1),
(2), (4) Date: Sep. 28, 2009

(87) PCT Pub. No.: WO2008/117855
PCT Pub. Date: Oct. 2, 2008

(65) Prior Publication Data
US 2010/0111806 A1 May 6, 2010

(30) Foreign Application Priority Data

Mar. 28, 2007 (JP) ................. 2007-083329

(51) Int. Cl.
| C01B 13/00 | (2006.01) |
| C01B 31/24 | (2006.01) |
| C01B 21/06 | (2006.01) |
| C01B 31/00 | (2006.01) |
| C01C 3/02 | (2006.01) |
| H01M 4/13 | (2010.01) |
| H01M 4/62 | (2006.01) |
| H01M 4/82 | (2006.01) |
| H01M 8/10 | (2006.01) |
| H01M 4/02 | (2006.01) |
| H01M 4/36 | (2006.01) |
| H01B 1/02 | (2006.01) |
| B05D 5/12 | (2006.01) |

(52) U.S. Cl. ............... 423/364; 423/414; 423/419.1; 423/372; 423/238; 205/414; 205/419; 205/424; 205/426; 205/431; 429/212; 429/523; 429/217; 429/209; 429/479; 252/512; 29/623.1; 427/58; 427/80; 427/523; 361/502

(58) Field of Classification Search .................. None
See application file for complete search history.

(56) References Cited

U.S. PATENT DOCUMENTS 4,396,733 A * 8/1983 Wagner et al. .............. 524/5
(Continued)

FOREIGN PATENT DOCUMENTS

JP H07-090588 4/1995
(Continued)

OTHER PUBLICATIONS

Sato et al., "Large Scale Rechargeable Batteries for Vehicles", CMC Publishing Co.,Ltd., Dec. 24, 2003.
(Continued)

Primary Examiner — Melvin Mayes
Assistant Examiner — Guinever Gregorio
(74) Attorney, Agent, or Firm — Morgan, Lewis & Bockius LLP

(57) ABSTRACT

The present invention provides a process for producing a nitrogen-containing carbon material, comprising a first step of subjecting azulmic acid to a first heat treatment in an oxygen-containing gas atmosphere, thereby preparing a heat-treated product, and a second step of subjecting the heat-treated product to a second heat treatment in an inert gas atmosphere.

6 Claims, 2 Drawing Sheets

U.S. PATENT DOCUMENTS

| | | | |
|---|---|---|---|
| 5,629,109 | A | 5/1997 | Ito et al. |
| 5,679,480 | A | 10/1997 | Takahashi et al. |
| 5,766,445 | A | 6/1998 | Hashizume et al. |
| 5,929,109 | A | 7/1999 | Mori et al. |
| 2009/0112020 | A1 | 4/2009 | Hinago et al. |

FOREIGN PATENT DOCUMENTS

| | | |
|---|---|---|
| JP | H08-180866 | 7/1996 |
| JP | H09-027317 | 1/1997 |
| JP | H10-021918 | 1/1998 |
| JP | 2000-001306 | 1/2000 |
| JP | 2001-080914 | 3/2001 |
| JP | 2003-137524 | 5/2003 |
| JP | 2003-277026 | 10/2003 |
| JP | 2004-168587 | 6/2004 |
| JP | 2004-342463 | 12/2004 |
| JP | 2005-000798 | 1/2005 |
| JP | 2005-239456 | 9/2005 |
| JP | 2006-124250 | 5/2006 |
| JP | 2005-89264 | 10/2006 |
| WO | WO 2007/043311 | 4/2007 |

OTHER PUBLICATIONS

Koji Hatai, "Carbon Materials for Negative Electrodes for Lithium Ion Secondary Batteries", Realize Science & Engineering Center Co., Ltd., Oct. 20, 1996, pp. 4 & 11.

Maya, L. et al., "Carbon-Nitrogen Pyrolyzates: Attempted Preparation of Carbon Nitride," Journal of the American Ceramic Society, vol. 74, No. 7, pp. 1686-1688, 1991.

Office Action for Chinese Patent Application No. 200680035969.6 dated Jul. 14, 2010.

Office Action for Korean Patent Application No. 10-2008-7007523 dated Aug. 17, 2010.

Li Chao et al., "Crystalline Carbon Nitride Deposited by Glow Discharge in Liquid Phase," Partial English translation Chemical Journal of Chinese Universities, vol. 25, No. 1, pp. 21-23, Jan. 31, 2004.

Office Action for Korean Patent Application No. 10-2008-7007523 dated Feb. 22, 2010.

\* cited by examiner

NITROGEN-CONTAINING CARBON MATERIAL AND PROCESS FOR PRODUCING THE SAME

TECHNICAL FIELD

The present invention relates to a nitrogen-containing carbon material and a process for producing the same.

BACKGROUND ART

Carbon materials have been mainly used as adsorbents; at the same time, a wide range of applications are now being studied as they have fundamental properties including properties of electronic materials such as conductivity, high thermal conductivity, low thermal expansion coefficient, lightness and heat resistance. Recently, in particular, their properties of electronic materials have been attracting attention and these materials are used or considered to be used in the field of electronic materials such as negative electrodes of lithium ion secondary batteries and electrodes for capacitors.

Such carbon materials are conventionally produced by carbonization treatment using coconut husk, coal coke, coal or petroleum pitch, furan resin or phenol resin as a raw material.

In recent years, attempts are made to expand and develop the properties of carbon materials by adding another element to carbon materials. Under the circumstances, nitrogen-containing carbon materials are reported to improve electrochemical properties when used for applications such as negative electrodes of lithium ion secondary batteries and electrodes for capacitors (see, for example, Patent Documents 1, 2). Nitrogen-containing carbon materials have also drawn attention as they are reported to have properties of adsorbents (see, for example, Patent Document 3) and hydrogen storage materials (see, for example, Patent Documents 4, 5).

Processes for producing a nitrogen-containing carbon material and nitrogen-containing carbon materials which are conventionally known are cited below.

As the processes for producing a nitrogen-containing carbon material, (1) a process in which a low molecular weight nitrogen-containing organic compound is chemically vapor-deposited (CVD) as a raw material and (2) a process in which a low molecular weight nitrogen-containing organic compound is polymerized as a raw material and the resulting resin is subjected to carbonization are mainly known.

As the aforementioned process (1), for example, a process in which a nitrogen-containing organic compound such as pyrrole is deposited on a substrate (see Patent Documents 6, 7), a process in which such a compound is deposited in the pore of a porous material (see Patent Document 3), a process in which an acyclic organic compound such as acetonitrile is deposited on a carbon material (see Patent Documents 8, 5) and a process in which 2,3,6,7-tetracyano-1,4,5,8-tetraazanaphthalene is polymerized and carbonized at a high temperature (see Patent Document 9) are known.

As the aforementioned process (2), for example, a process in which a melamine resin, an urea resin or an aniline resin is carbonized at a high temperature (see Patent Document 10), a process in which polyimide is carbonized at a high temperature (see Patent Document 1), a process in which polyaniline is carbonized at a high temperature (see Patent Document 2), a process in which polypyrrole is carbonized at a high temperature (see Patent Document 11), a process in which phthalocyanine is mixed with a precursor of a furan resin and the mixture is carbonized at a high temperature (see Patent Document 12) and a process in which polyacrylonitrile is carbonized at a high temperature (see, for example, Patent Document 13) are known.

[Patent Document 1] Japanese Patent Application Laid-Open No. 2001-80914
[Patent Document 2] Japanese Patent Application Laid-Open No. 10-21918
[Patent Document 3] Japanese Patent Application Laid-Open No. 2004-168587
[Patent Document 4] Japanese Patent Application Laid-Open No. 2005-798
[Patent Document 5] Japanese Patent Application Laid-Open No. 2003-277026
[Patent Document 6] Japanese Patent Application Laid-Open No. 7-90588
[Patent Document 7] Japanese Patent Application Laid-Open No. 9-27317
[Patent Document 8] Japanese Patent Application Laid-Open No. 2004-342463
[Patent Document 9] Japanese Patent Application Laid-Open No. 2003-137524
[Patent Document 10] Japanese Patent Application Laid-Open No. 2000-1306
[Patent Document 11] Japanese Patent Application Laid-Open No. 8-165111
[Patent Document 12] Japanese Patent Application Laid-Open No. 2004-362802
[Patent Document 13] Japanese Patent Application Laid-Open No. 8-180866
[Patent Document 14] Japanese Patent Application Laid-Open No. 2005-239456

DISCLOSURE OF THE INVENTION

Problems to be Solved by the Invention

However, neither of the above-described processes (1) and (2) can provide a satisfactory material or a process, which achieves a high nitrogen content and a low hydrogen content with accomplishing resource saving and energy saving.

More specifically, as for the process of the above-described (1), the process using CVD itself is unsuitable for industrial mass production. Moreover, using a compound containing halogen such as chlorine in the CVD step is not preferred because of the problem of the corrosion of the material.

Furthermore, nitrogen-containing carbon materials prepared by CVD generally have a low nitrogen content and a high hydrogen content. Also, a nitrile group or a halogen group remains in such nitrogen-containing carbon materials. In Patent Document 6, Patent Document 9 and Patent Document 5, for example, a nitrogen-containing carbon material is produced by CVD using pyrrole, 2,3,6,7-tetracyano-1,4,5,8-tetraazanaphthalene, acetonitrile or bromine cyanide as a raw material. These nitrogen-containing carbon materials have a low nitrogen content or a high hydrogen content. Also, a nitrile group or a halogen group remains in those nitrogen-containing carbon materials.

The process of (2) has the problem that resins are expensive. More specifically, production steps are complicated as monomers which are raw materials of resins are produced through a multistage reaction, or a carbon material is produced using a resin synthesized from a monomer not commercially mass-produced as a raw material. As a result, when considering the processes starting from basic raw materials, there is a problem of consuming an enormous amount of raw materials and energy before a carbon material is produced. Moreover, complicated polymerization steps, resin molding steps and fiberization steps lead to consumption of more and more raw materials and energy for producing a nitrogen-containing carbon material through carbonization. Consequently, the nitrogen-containing carbon material becomes expensive and is unsuitable for supplying for various applications. Moreover, the problem is that the recovery rate of carbide upon the carbonization of resin is low. Another problem is that the nitrogen content in the nitrogen-containing carbon material is low. On the other hand, when the carbonization temperature is lowered or the carbonization time is shortened with the intention of increasing the nitrogen content, carbonization is hindered, resulting in an increased hydrogen content and insufficient formation of conjugated structures, which causes another problem that the properties of carbon materials are not fully demonstrated. Additionally, using halogen such as chlorine or setting high pressure conditions in the carbonization step is industrially disadvantageous in terms of materials and operation.

In short, the nitrogen-containing carbon materials prepared by conventional techniques have the problem of low nitrogen content and high hydrogen content, and the problem of inclusion of a nitrile group or a halogen group. It is known that a high content of nitrogen atoms is advantageous for carbon materials used in the field of electronic materials such as hydrogen storage materials, lithium ion secondary batteries and capacitors (e.g., Patent Document 5, Patent Document 7, Patent Document 14). Also, because the lower the hydrogen content, the more the conjugated structures grow, the low hydrogen content is advantageous for electronic properties such as electronic conductivity. Also, the presence of a functional group is undesirable.

The relation between hydrogen content and conjugated structures is herein briefly described although it is already known.

The mechanism of developing electronic properties such as electronic conductivity is known as described in Sections 2 and 3 in Dodensei Kobunshi no Kiso to Oyo (Industrial Publishing & Consulting, Inc, 1998). For example, while polyethylene represented by the structural formula of the following (1) is insulative, polyacetylene represented by the structural formula of the following (2) is conductive.

[formula 1]

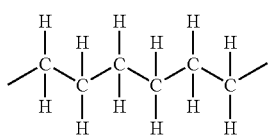

(1)

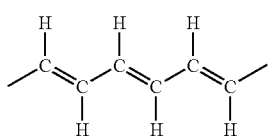

(2)

In the structure containing saturated bonds alone such as polyethylene, electrons are used for binding atoms as 6 electrons and cannot move freely. On the other hand, structures containing a double bond and a single bond, such as polyacetylene, are called conjugated structures, which contain highly mobile electrons called π electrons. As a result, such structures have electronic properties such as electronic conductivity. The more the conjugated structure expands (two-dimensionally or the larger the molecular weight), the higher the electronic properties such as conductivity.

In terms of the hydrogen content, polyacetylene has a low hydrogen content. This is because hydrogen atoms need to be abstracted to have a double bond. Also, in the structure in which benzene rings repeat, the more the structure expands two-dimensionally, the lower the hydrogen content. Accordingly, the low hydrogen content is an important indicator for developing conjugated structures.

The same applies to polymers containing a nitrogen atom. For example, melamine resin is a polymer of an extremely high nitrogen content, but is insulative because its conjugated structure is disconnected at each triazine ring. However, when the resin is carbonized, the conjugated structure grows while the hydrogen content decreases, resulting in development of electronic properties of capacitors and hydrogen storage materials.

These facts suggest that a novel carbon material in which not only the nitrogen content is high but also the hydrogen content is low and a process for producing the same are desired.

It is an object of the present invention to provide a process for producing a nitrogen-containing carbon material, which is industrially easy and enables mass production.

It is also an object of the present invention to provide a novel nitrogen-containing carbon material which has a high content of nitrogen atoms and a low content of hydrogen atoms.

Means for Solving the Problems

The present inventors have conducted intensive studies to solve the above problems and as a result have found a novel process for producing a nitrogen-containing carbon material and a novel nitrogen-containing carbon material, and the present invention has been accomplished.

Accordingly, the present invention is as follows.

(1) A process for producing a nitrogen-containing carbon material, comprising a first step of subjecting azulmic acid to a first heat treatment in an oxygen-containing gas atmosphere, thereby preparing a heat-treated product, and a second step of subjecting said heat-treated product to a second heat treatment in an inert gas atmosphere.

(2) A process for producing a nitrogen-containing carbon material according to the above (1), wherein said first heat treatment is carried out at 170 to 600° C.

(3) A nitrogen-containing carbon material produced by the process according to the above (1) or (2), comprising a carbon atom, a hydrogen atom and a nitrogen atom.

(4) A nitrogen-containing carbon material in which the nitrogen atom, the carbon atom and the hydrogen atom satisfy the conditions represented by the following formulas (I) and (II):

$$(N_N/N_C) > 1.209 \times (N_H/N_C) - 0.0346 \quad (I)$$

$$(N_N/N_C) > 0.04 \quad (II)$$

wherein $N_N$, $N_C$ and $N_H$ each represent the number of the nitrogen atoms, the carbon atoms and the hydrogen atoms.

Advantages of the Invention

The present invention makes it possible to provide a process for producing a nitrogen-containing carbon material, which is industrially easy and enables mass production.

The present invention also makes it possible to provide a novel nitrogen-containing carbon material which has a high content of nitrogen atoms and a low content of hydrogen atoms.

BEST MODE FOR CARRYING OUT THE INVENTION

In the following, the best mode for carrying out the present invention (hereinafter simply referred to as "present embodiment") is described in detail with referring to the figures according to need.

Figure 1:
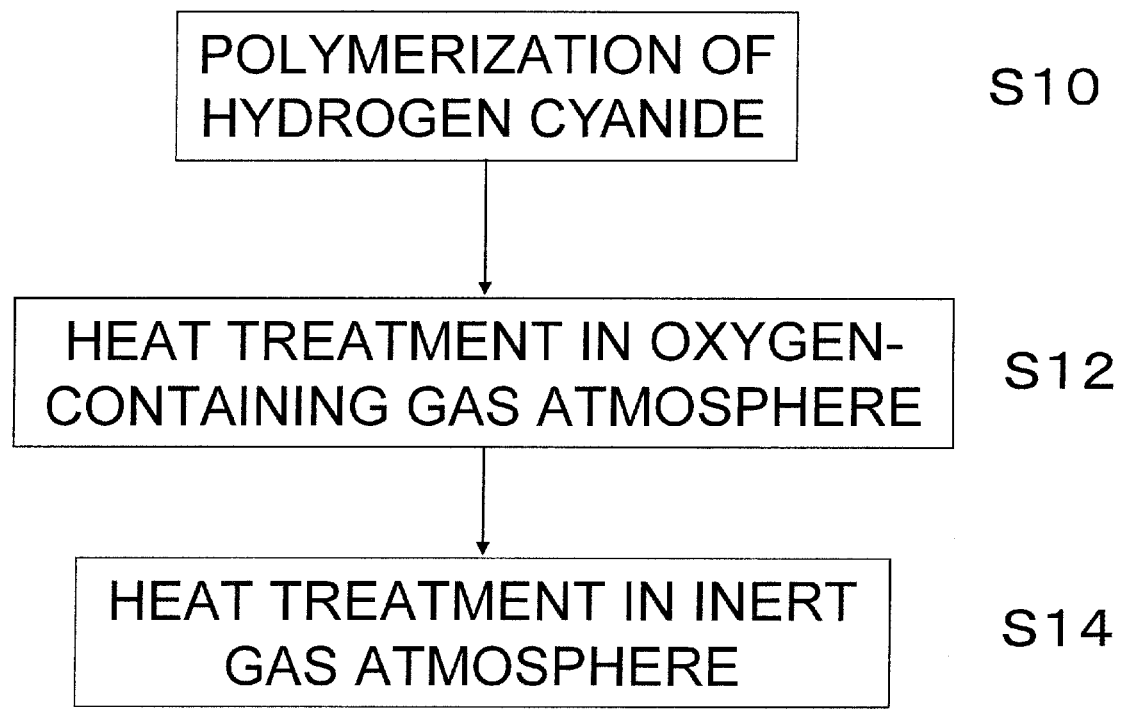
FIG. 1 is a schematic view of steps illustrating the process for producing a nitrogen-containing carbon material according to the present embodiment.

FIG. 1 is a process chart for illustrating the process for producing a nitrogen-containing carbon material according to the present embodiment. As shown in FIG. 1, the process for producing a nitrogen-containing carbon material of the present embodiment comprises a step S10 of preparing azulmic acid by polymerization of a raw material containing hydrogen cyanide, a first step S12 of subjecting azulmic acid to a first heat treatment in an oxygen-containing gas atmosphere, thereby preparing a heat-treated product, and a second step S14 of subjecting the heat-treated product to a second heat treatment in an inert gas atmosphere. Herein, "azulmic acid" is a generic name for polymers prepared by polymerizing mainly hydrogen cyanide (hydrogen cyanide). Each step is described in detail below.

Firstly, in Step S10, raw materials mainly containing hydrogen cyanide are subjected to polymerization to obtain an azulmic acid. As hydrogen cyanide to be used in Step S10, one produced by a well-known method can be used, and it is produced by, for example, the following methods. The production process of hydrogen cyanide is, however, not limited to these. Specifically, hydrogen cyanide is by-produced in a method for producing acrylonitrile and methacrylonitrile by vapor phase catalytic reaction in which propylene, isobutylene, tert-butyl alcohol, propane or isobutane is reacted with ammonia, oxygen-containing gas in the presence of a catalyst. On this account, hydrogen cyanide to be used in Step S10 can be obtained very inexpensively. Since the above-mentioned vapor phase catalytic reaction is a conventionally well-known reaction, the reaction conditions may be those well known. But, for example, raw materials generating hydrogen cyanide by ammoxidation reaction such as methanol may be supplied to a reactor to increase the yield of hydrogen cyanide.

Hydrogen cyanide produced by Andrussow process in which methane which is the main ingredient of the natural gas is reacted with ammonia, oxygen-containing gas in the presence of a catalyst can be also used. This process is one which gives hydrogen cyanide very inexpensively since what is used is methane.

Of course the production process of hydrogen cyanide may be a laboratory production process using soda cyanide or the like, but it is preferable to use hydrogen cyanide produced industrially mentioned above from a viewpoint of capability of producing hydrogen cyanide in a large quantity and at a low cost.

Raw materials mainly containing hydrogen cyanide are subjected to polymerization in Step S10 to obtain azulmic acids which are mainly polymers of hydrogen cyanide with from black to blackish brown colors. Here, in order to prepare azulmic acid of high purity, the content of the polymer substances other than hydrogen cyanide based on the whole amount of the raw materials mainly containing the hydrogen cyanide is preferably 40% by weight or less, more preferably 10% by weight or less, still more preferably 5% by weight or less, and particularly preferably 1% by weight or less. That is, the content of hydrogen cyanide in the raw materials mentioned above is preferably 60% by mass or more, more preferably 90% by mass or more, still more preferably 95% by mass or more and particularly preferably 99% by mass or more.

Azulmic acid can be prepared by polymerizing hydrogen cyanide optionally with a small amount of polymerizable substance other than that by various methods.

Examples of the polymerization methods include a method of heating liquefied hydrogen cyanide or a hydrogen cyanide aqueous solution, a method of standing still the liquefied hydrogen cyanide or a hydrogen cyanide aqueous solution for a long period of time, a method of adding a base to liquefied hydrogen cyanide or a hydrogen cyanide aqueous solution, a method of irradiating light to liquefied hydrogen cyanide or a hydrogen cyanide aqueous solution, a method of irradiating a high energy radiation to liquefied hydrogen cyanide or a hydrogen cyanide aqueous solution and a method of performing various kinds of discharging in the presence of liquefied hydrogen cyanide or a hydrogen cyanide aqueous solution, which are methods described in, for example, Angew. Chem. vol. 72, pp. 379-384 (1960) and the references cited therein or Shinku Kagaku (Vacuum Science), vol. 16, pp. 64-72 (1969) and the references cited therein.

As the base in a method of adding a base to liquefied hydrogen cyanide or a hydrogen cyanide aqueous solution to polymerize hydrogen cyanide in the presence of the base, for example, sodium hydroxide, potassium hydroxide, sodium cyanide, potassium cyanide, organic bases, ammonia, an ammonium solution can be exemplified as the base. Examples of the organic bases include primary amines $R^1NH_2$, secondary amines $R^1R^2NH$, tertiary amines $R^1R^2R^3N$, quaternary ammonium salts $R^1R^2R^3R^4N^+$. Here, $R^1$, $R^2$, $R^3$ and $R^4$, which may be the same or different from each other, represent an alkyl group having 1 to 10 carbon atoms, a phenyl group, a hexyl group and those obtained by binding these. $R^1$, $R^2$, $R^3$ and $R^4$ may have further substituents. Among these organic bases, aliphatic or cyclic aliphatic tertiary amines are preferable. Examples of such a tertiary amine include trimethylamine, triethylamine, tripropylamine, tributylamine, dicyclohexylmethylamine, tetramethylammonium hydroxide, N-methylpyrrolidine and 1,8-diazabicyclo[5.4.0]undec-7-ene (DBU). The bases mentioned above can be used singly or in combination of two or more kinds together.

Since the azulmic acid is hardly soluble or insoluble in a solvent, the detailed chemical structure is not identified. But the structural formula of the azulmic acid is presumed as represented by the following general formulas (A) to (F) for in the documents such as Angew. Chem., vol. 72, pp. 379-384 (1960), Shinku Kagaku (Vacuum Science), vol. 16, pp. 64-72 (1969) and Origins of Life and Evolution of the Biosphere vol. 28, pp. 461-473 (1998).

[Formula 2]

(A) 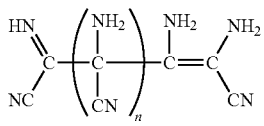

[Formula 3]

(B) 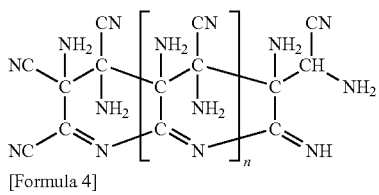

[Formula 4]

(C) 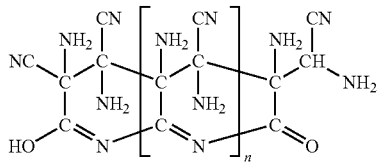

[Formula 5]

(D) 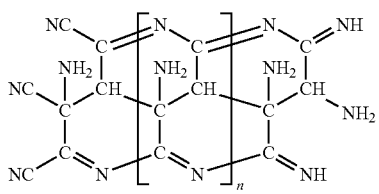

[Formula 6]

(E) 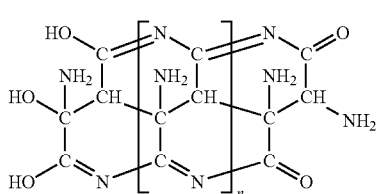

[Formula 7]

(F) 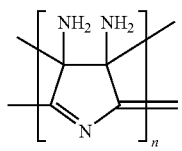

It is presumed that the actual structure may be, based on these structural formulas, those in which part of nitrogen atoms constituting a six-membered ring of the polymer structure are substituted with carbon atoms, or conversely, part of carbon atoms constituting some six-membered rings are substituted with nitrogen atoms. In addition, according to the documents mentioned above, there are functional groups such as an amino group, an imino group, a nitrile group, a hydroxyl group, the carbonyl group in the structure of the azulmic acid. It is presumed, however, that part of these functional groups may be actually substituted with each other or not present in the structure or substituted with a carboxylic acid group, a nitro group, a nitroso group, an N-oxide group, an alkyl group, a hydrogen atom or the other well-known functional groups and atoms.

It is also considered that a seven-membered ring and so on may be present as the ring structure as well as the five-membered ring and six-membered ring as mentioned above. Besides, as well as linear structures, ladder structures and the structure condensed between ladders, there may be caused structures condensed or linked between these structures, and it is presumed that one structure may contain partial structure of a linear structure, a five-membered ring, a six-membered ring, a seven-membered ring and so on.

The composition of the azulmic acid used in this embodiment is measured with a CHN analyzer. The ratio of mass % of nitrogen atom to mass % of carbon atom ((mass % of nitrogen atom)/(mass % of carbon atom)) in the azulmic acid is preferably 0.2 to 1.0, more preferably 0.3 to 0.9 and particularly preferably 0.4 to 0.9. The ratio of mass % of hydrogen atom to mass % of carbon atom ((mass % of hydrogen atom)/(mass % of carbon atom)) in the azulmic acid is preferably 0.03 to 0.2, more preferably 0.05 to 0.15 and particularly preferably 0.08 to 0.11.

The azulmic acid to be used in this embodiment preferably has peaks at Raman shifts of both of 1300 to 1400 $cm^{-1}$ and 1500 to 1600 $cm^{-1}$, and particularly preferably also show peaks at both of 1360 to 1380 $cm^{-1}$ and 1530 to 1550 $cm^{-1}$ in the spectrogram by laser Raman spectrometry in the range of the wave number 1000 to 2000 $cm^{-1}$.

Also, the azulmic acid to be used in this present embodiment shows a strong peak at a position corresponding to a diffraction angle (2θ) of 26.8±1° in the X-ray diffraction patterns obtained by using a CuKα ray as an X-ray source in the range of 10 to 50°. This peak is preferably at a position of 26.8±0.5°, more preferably 26.8±0.2°. Azulmic acid with such a peak has a layered structure composed of the sp2 orbital and is suitable as a material of an electrode in batteries.

In addition to the above-mentioned peak, the azulmic acid to be used in the present invention may preferably show a peak at a position corresponding to a diffraction angle (2θ) of 12.3±1°, more preferably 12.3±0.5° in the X-ray diffraction patterns obtained by using a CuKα ray as an X-ray source in the range of 10 to 50°.

Next, in step S12, azulmic acid is subjected to a first heat treatment in an oxygen-containing gas atmosphere to prepare a heat-treated product. Conditions in the first heat treatment are as follows, but not limited thereto. In step S12, azulmic acid is subjected to a heat treatment in air using, for example, a rotary furnace, a tunnel furnace, a tubular furnace, a fluidized calcining furnace or a muffle furnace. The temperature for the heat treatment is preferably 170° C. or higher, more preferably 180° C. or higher, further preferably 200° C. or higher, and particularly preferably 220° C. or higher. The temperature for the heat treatment is preferably 600° C. or lower, more preferably 500° C. or lower, further preferably 400° C. or lower, and particularly preferably 350° C. or lower.

When the temperature for the heat treatment is lower than 170° C., the advantage of a high nitrogen atom content and a low hydrogen atom content in the heat-treated product is not so great. When the temperature exceeds 600° C., azulmic acid is burned, resulting in a decrease in the recovery rate and discoloration due to a change in the chemical structure of azulmic acid.

Also, as an oxygen-containing gas, a gas in which the oxygen concentration is lowered by adding inert gas to air or a gas in which the oxygen concentration is increased by adding oxygen gas to air may be used.

The oxygen concentration in the oxygen-containing gas is preferably 5 to 30% by volume, more preferably 15 to 25% by volume. To save energy, direct use of air as the oxygen-containing gas is particularly preferred. The oxygen-containing gas in the atmosphere may be stationary or flowing, but is preferably flowing because the oxygen consumed in the heat treatment can be effectively supplied.

The time for the first heat treatment is preferably 1 minute to 100 hours, more preferably 30 minutes to 10 hours, and further preferably 1 to 5 hours. The pressure of the atmosphere in the first heat treatment is preferably 0.01 to 5 MPa, more preferably 0.05 to 1 MPa, further preferably 0.08 to 0.3 MPa, and particularly preferably 0.09 to 0.15 MPa.

Next, in step S14, the heat-treated product prepared in step S12 is subjected to a second heat treatment in an inert gas atmosphere. The heat-treated product is carbonized by the treatment to give a nitrogen-containing carbon material according to the present embodiment. Conditions in the second heat treatment are as follows, but not limited thereto. In step S14, the heat-treated product is subjected to a heat treatment in an inert gas atmosphere using, for example, a rotary furnace, a tunnel furnace, a tubular furnace or a fluidizind-bed furnace. The temperature for the heat treatment is preferably 500 to 3000° C., more preferably 550 to 1500° C., further preferably 600 to 1100° C. Setting the temperature for the heat treatment to the above-described range gives rise to the advantage of a high nitrogen content and a low hydrogen content.

Examples of such inert gas mentioned above include inert gases such as nitrogen, argon, helium, neon and carbon dioxide. Also, the inert gas atmosphere may be under reduced pressure; that is, a pressure environment lower than the atmospheric pressure. Among these, it is preferable to use nitrogen gas as an inert gas. The inert gas may be allowed to stand still or the inert gas atmosphere may be flowed, but it is preferable to flow the inert gas. The oxygen concentration in the inert gas is preferably 5% by volume or less, more preferably 1% by volume or less, and particularly preferably 1000 volume ppm or less. When the inert gas atmosphere is under reduced pressure, the pressure is preferably 1 Pa to 0.05 MPa, more preferably 10 Pa to 0.03 MPa.

The time for the carbonization treatment, which is the second heat treatment, is preferably 10 seconds to 100 hours, more preferably 5 minutes to 10 hours, further preferably 15 minutes to 5 hours, and particularly preferably 30 minutes to 2 hours. The pressure of the atmosphere in the second heat treatment using inert gas is preferably 0.01 to 5 MPa, more preferably 0.05 to 1 MPa, further preferably 0.08 to 0.3 MPa, and particularly preferably 0.09 to 0.15 MPa. The second heat treatment under a high pressure condition of higher than 5 MPa is likely to cause the heated product to have a diamond structure composed of the sp3 orbital, making it difficult to prepare the desired nitrogen-containing carbon material. In other words, the nitrogen-containing carbon material produced by the process according to the present embodiment preferably has a layered structure composed of the sp2 orbital.

The nitrogen-containing carbon material according to the present embodiment produced in that way contains a carbon atom, a hydrogen atom and a nitrogen atom, which preferably satisfy the conditions represented by the following formulas (I) and (II)

$$(N_N/N_C) > 1.209 \times (N_H/N_C) - 0.0346 \quad \text{(I)}$$

$$(N_N/N_C) > 0.04 \quad \text{(II)}$$

wherein $N_N$, $N_C$ and $N_H$ each represent the number of the nitrogen atoms, the carbon atoms and the hydrogen atoms in the nitrogen-containing carbon material.

The ratio of the number of nitrogen atoms or hydrogen atoms to the number of carbon atoms, $(N_N/N_C)$ or $(N_H/N_C)$, is derived from the content of each atom as measured by a CHN analyzer.

A nitrogen-containing carbon material that satisfies the conditions represented by the above formulas (I) and (II) means that it has an appropriately small $(N_H/N_C)$ and an appropriately high $(N_N/N_C)$. Such a nitrogen-containing carbon material is preferred because it has a sufficiently developed conjugated structure and a sufficiently high nitrogen content.

From the same point of view, nitrogen atoms, carbon atoms and hydrogen atoms included in the nitrogen-containing carbon material preferably satisfy the condition represented by the following formula (III).

$$(N_N/N_C) > 1.227 \times (N_H/N_C) - 0.0236 \quad \text{(III)}$$

The ratio of the number of nitrogen atoms to the number of carbon atoms $(N_N/N_C)$ and the ratio of the number of hydrogen atoms to the number of carbon atoms $(N_H/N_C)$ in the nitrogen-containing carbon material according to the present embodiment preferably satisfy the condition represented by the following formula (IV).

$$(N_N/N_C) < 1.2 \times (N_H/N_C) + 0.15 \quad \text{(IV)}$$

The nitrogen-containing carbon material satisfying the formula (IV) is preferred because it prevents the loss of facilities, resources and energy in the step of producing azulmic acid (step S10) or the step of carbonization of azulmic acid (step S14).

From the same point of view, the nitrogen-containing carbon material preferably satisfies the condition represented by the following formula (V).

$$(N_N/N_C) < 1.2 \times (N_H/N_C) + 0.08 \quad \text{(V)}$$

Figure 2:
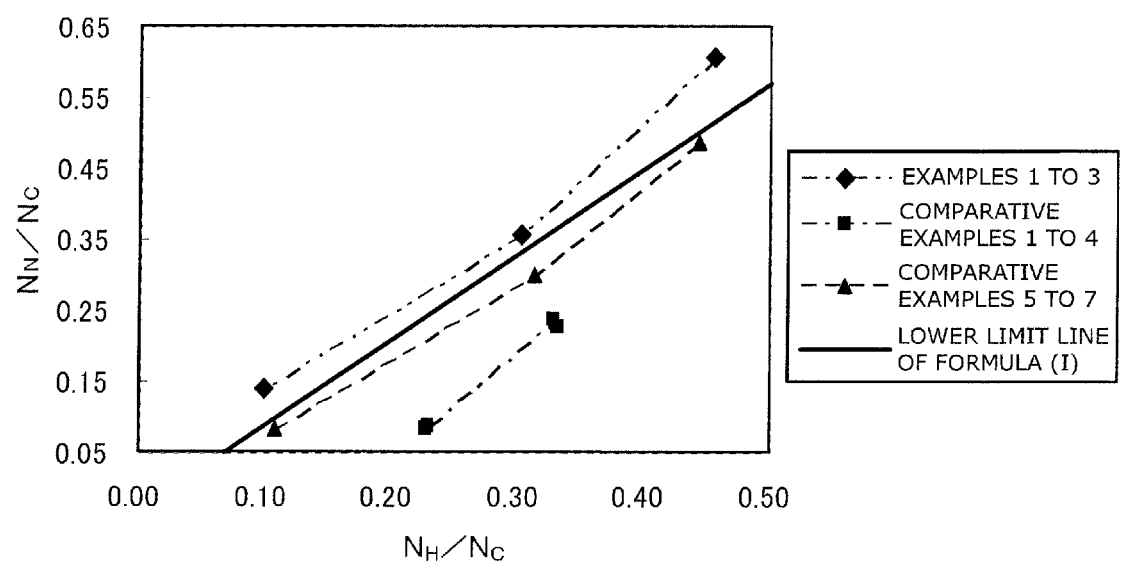
FIG. 2 is a plotted graph showing a comparison between the nitrogen-containing carbon materials prepared in Examples and the nitrogen-containing carbon materials prepared in Comparative Examples with ($N_H/N_C$) on the horizontal axis and ($N_N/N_C$) on the longitudinal axis.

The above formulas (I) to (V) are derived as a range surrounding Examples in FIG. 2. In other words, the range is surrounded by lines generally parallel to the slope of the line obtained by connecting Examples.

Also, the nitrogen-containing carbon material according to the present embodiment has a ratio of the number of hydrogen atoms to the number of carbon atoms $(N_H/N_C)$ of preferably 0.01 to 0.45, more preferably 0.05 to 0.40, further preferably 0.05 to 0.35, and particularly preferably 0.10 to 0.35.

A $(N_H/N_C)$ of 0.45 or less is preferred because it suggests sufficient development of the conjugated system. A $(N_H/N_C)$ of 0.01 or more is preferred because it suggests a relative increase of the nitrogen atom content.

The nitrogen-containing carbon material according to the present embodiment has a ratio of the number of nitrogen atoms to the number of carbon atoms $(N_N/N_C)$ of preferably 0.04 to 1.0, more preferably 0.05 to 0.7, further preferably 0.08 to 0.4, and particularly preferably 0.15 to 0.3. $(N_N/N_C)$ values in such a range make it possible to increase the nitrogen content moderately and hold down the cost in each of the above steps.

The nitrogen-containing carbon material according to the present embodiment is produced by the above-described process and achieves a higher $(N_N/N_C)$ despite the low $(N_H/N_C)$ compared to that of conventional nitrogen-containing carbon materials. In other words, the nitrogen-containing carbon material has a fully developed conjugated system and at the same time, contains a lot of nitrogen atoms.

According to the process for producing a nitrogen-containing carbon material according to the present embodiment, hydrogen cyanide produced as a by-product in the process for producing a monomer such as acrylonitrile can be used in step S10 of preparing azulmic acid by polymerizing a raw material mainly containing hydrogen cyanide. Therefore, the process for producing a nitrogen-containing carbon material according to the present embodiment saves resources and energy. Moreover, since the process makes it easy to polymerize hydrogen cyanide, it is easy to produce azulmic acid and a nitrogen-containing carbon material produced therefrom, and even mass production becomes possible. In another respect, since azulmic acid itself is used, which has been discarded and has not been used because it is produced as a by-product in the above-described process for producing a monomer, the process saves resources and energy in this respect as well, making mass production possible.

Also, having step S12 and step S14, the process for producing a nitrogen-containing carbon material according to the present embodiment increases the recovery rate of the carbide of the heat-treated product, and thus is an efficient process.

Furthermore, since the nitrogen-containing carbon material produced by the above process is in the form of powder, it does not require molding step such as a resinification step or a fiberization step, or the subsequent crushing step, offering improved handling properties.

Although the best mode for carrying out the present invention has been described, the present invention is not limited to the above embodiment. Many modifications of the present invention may be made without departing from the spirit thereof. For example, azulmic acid can also be produced by recovering from the step of purifying hydrogen cyanide produced as a by-product in the ammoxidation step of propylene or the like.

EXAMPLES

The present invention is described in more detail by means of Examples below, but they are merely illustrative and do not limit to the present invention. Those skilled in the art can put the present invention into practice by variously changing the Examples described below; and such changes are covered within the claims of the present invention.
<Method of Analysis>
(CHN Analysis)

The CHN analysis was carried out by using MICRO CORDER JM10 (product name) CHN analyzer manufactured by J-Science Lab Co. Ltd. and filling 2,500 μg of a sample in a sample holder. A sample furnace, a combustion furnace (copper oxide catalyst), and a reduction furnace (composed of silver particles+copper oxide zone, a reduced copper zone, and a copper oxide zone) were set at 950° C., 850° C., and 550° C., respectively. Oxygen and He were flowed in the furnace and the flow rate of oxygen was set at 15 ml/min and the flow rate of He was set at 150 ml/min. TCD was used for the detector of each element. Antipyrine was used for calibration according to a method described in the manual. Before the CHN analysis, the sample was sufficiently dried by vacuum drying at 150° C.

Preparation Example

<Preparation of Azulmic Acid>
An aqueous solution in which 150 g of hydrogen cyanide is dissolved in 350 g of water was prepared and 120 g of 25% ammonia aqueous solution was added to this aqueous solution for 10 minutes while the aqueous solution was stirred, and the resultant mixed solution was heated to 35° C. Polymerization of hydrogen cyanide started and a blackish brown polymer began to deposit, and the temperature elevated slowly to 45° C. 30 mass % hydrogen cyanide aqueous solution was added at a rate of 200 g/h from 2 hours later after the polymerization started for 4 hours. The aqueous solution was cooled and controlled so that the reaction temperature was maintained at 50° C. during the addition of the hydrogen cyanide aqueous solution. The cooling was stopped after the addition of the hydrogen cyanide aqueous solution ended, and then the temperature elevated to 90° C., and after the temperature remained at this temperature for about 1 hour, the temperature descended slowly. After that, the reaction was performed as it is for 100 hours. The resultant black sediment was separated by filtration. The yield of the sediment at this time was 97% for the total amount of the used hydrogen cyanide. After the separated sediment was washed with water and dried in a dryer at 120° C. for 5 hours and black azulmic acid was obtained.

Example 1

The azulmic acid prepared in the above Preparation Example was subjected to a heat-treatment at 330° C. in the air for 1 hour to obtain 330° C.-heat treatment product (step S12).

12 g of the 330° C.-heat treatment product obtained as above was sampled and filled in a quartz tube having an inner diameter of 25 mm. The temperature of this 330° C.-heat treatment product was elevated to 600° C. over 40 minutes in a nitrogen gas flow of 300 Ncc/min under atmospheric pressure, and held at 600° C. for 1 hour for heat-treatment to obtain 7.5 g of a nitrogen-containing carbon material (step S14). The yield of the nitrogen-containing carbon material for the heat treatment product mentioned above was 62%. The oxygen concentration in the nitrogen gas used was found to be 1 ppm as a result of measurement using a trace oxygen analyzer (306WA-type, manufactured by Teledyne Analytical Instruments).
<Analysis of Nitrogen-Containing Carbon Material>
(Result of CHN Analysis)

The resulting nitrogen-containing carbon material was found to have a carbon atom content of 55.0% by mass, a nitrogen atom content of 39.0% by mass and a hydrogen atom content of 2.1% by mass. The ratio of the number of nitrogen atoms to the number of carbon atoms ($N_N/N_C$) was 0.61. The ratio of the number of hydrogen atoms to the number of carbon atoms ($N_H/N_C$) was 0.46.

Example 2

The azulmic acid prepared in the above Preparation Example was subjected to a heat-treatment at 330° C. in the air for 1 hour to obtain 330° C.-heat treatment product (step S12).

12 g of the 330° C.-heat treatment product obtained as above was sampled and filled in a quartz tube having an inner diameter of 25 mm. The temperature of this 330° C.-heat treatment product was elevated to 800° C. over 50 minutes in a nitrogen gas flow of 300 Ncc/min under atmospheric pressure, and held at 800° C. for 1 hour for heat-treatment to obtain 4.9 g of a nitrogen-containing carbon material (step S14). The yield of the nitrogen-containing carbon material for the heat treatment product mentioned above was 41%. The oxygen concentration in the nitrogen gas used was found to be 1 ppm as a result of measurement using a trace oxygen analyzer (306WA-type, manufactured by Teledyne Analytical Instruments).

<Analysis of Nitrogen-Containing Carbon Material>
(Result of CHN Analysis)

The resulting nitrogen-containing carbon material was found to have a carbon atom content of 67.1% by mass, a nitrogen atom content of 28.0% by mass and a hydrogen atom content of 1.7% by mass. The ratio of the number of nitrogen atoms to the number of carbon atoms ($N_N/N_C$) was 0.36. The ratio of the number of hydrogen atoms to the number of carbon atoms ($N_H/N_C$) was 0.30.

Example 3

The azulmic acid prepared in the above Preparation Example was subjected to a heat-treatment at 250° C. in the air for 5 hour to obtain 250° C.-heat treatment product (step S12).

12 g of the 250° C.-heat treatment product obtained as above was sampled and filled in a quartz tube having an inner diameter of 25 mm. The temperature of this 250° C.-heat treatment product was elevated to 1000° C. over 70 minutes in a nitrogen gas flow of 300 Ncc/min under atmospheric pressure, and held at 1000° C. for 1 hour for heat-treatment to obtain 3.8 g of a nitrogen-containing carbon material (step S14). The yield of the nitrogen-containing carbon material for the heat treatment product mentioned above was 31%. The oxygen concentration in the nitrogen gas used was found to be 1 ppm as a result of measurement using a trace oxygen analyzer (306WA-type, manufactured by Teledyne Analytical Instruments).

<Analysis of Nitrogen-Containing Carbon Material>
(Result of CHN Analysis)

The resulting nitrogen-containing carbon material was found to have a carbon atom content of 85.0% by mass, a nitrogen atom content of 14.0% by mass and a hydrogen atom content of 0.7% by mass. The ratio of the number of nitrogen atoms to the number of carbon atoms ($N_N/N_C$) was 0.14. The ratio of the number of hydrogen atoms to the number of carbon atoms ($N_H/N_C$) was 0.10.

In Comparative Examples 1 to 4 described below, a nitrogen-containing carbon material was prepared by heat-treating a melamine resin of a highest nitrogen content as a precursor of a nitrogen-containing carbon material.

<Preparation of Melamine Resin>

252 g of melamine and 650 mL of 37% formaldehyde aqueous solution were mixed, and a small amount of 6 mol/L potassium hydroxide aqueous solution was added thereto while the mixture was stirred to obtain a reaction liquid of pH 8 to 9. The reaction liquid was stirred at 80° C. while refluxing to perform polymerization for 50 hours. During this process, a potassium hydroxide aqueous solution was appropriately added to the reaction liquid to keep the pH in the range of 8 to 9. Heating of the reaction liquid was stopped 50 hours later and the reaction liquid was allowed to cool. Furthermore, 1,500 g of water were added thereto to allow a viscous resin to separate, which was taken out of the reaction liquid and vacuum dried at 80° C. to obtain a melamine resin.

Comparative Example 1

12 g of the melamine resin prepared as described above was sampled and filled in a quartz tube having an inner diameter of 25 mm. The temperature of this melamine resin was elevated to 800° C. over 50 minutes in a nitrogen gas flow of 300 Ncc/min under atmospheric pressure, and held at 800° C. for 1 hour for heat-treatment to obtain 1.5 g of a nitrogen-containing carbon material (step S14). The yield of the nitrogen-containing carbon material for the melamine resin was 13%. The oxygen concentration in the nitrogen gas used was found to be 1 ppm as a result of measurement using a trace oxygen analyzer (306WA-type, manufactured by Teledyne Analytical Instruments).

<Analysis of Nitrogen-Containing Carbon Material>
(Result of CHN Analysis)

The resulting nitrogen-containing carbon material was found to have a carbon atom content of 68.2% by mass, a nitrogen atom content of 17.9% by mass and a hydrogen atom content of 1.9% by mass. The ratio of the number of nitrogen atoms to the number of carbon atoms ($N_N/N_C$) was 0.22. The ratio of the number of hydrogen atoms to the number of carbon atoms ($N_H/N_C$) was 0.33.

Comparative Example 2

The melamine resin prepared as described above was subjected to a heat-treatment at 330° C. in the air for 1 hour to obtain 330° C.-heat treatment product.

12 g of the 330° C.-heat treatment product obtained as above was sampled and filled in a quartz tube having an inner diameter of 25 mm. The temperature of this 330° C.-heat treatment product was elevated to 800° C. over 50 minutes in a nitrogen gas flow of 300 Ncc/min under atmospheric pressure, and held at 800° C. for 1 hour for heat-treatment to obtain 1.5 g of a nitrogen-containing carbon material. The yield of the nitrogen-containing carbon material for the heat treatment product mentioned above was 13%. The oxygen concentration in the nitrogen gas used was found to be 1 ppm as a result of measurement using a trace oxygen analyzer (306WA-type, manufactured by Teledyne Analytical Instruments).

<Analysis of Nitrogen-Containing Carbon Material>
(Result of CHN Analysis)

The resulting nitrogen-containing carbon material was found to have a carbon atom content of 69.0% by mass, a nitrogen atom content of 19.0% by mass and a hydrogen atom content of 1.9% by mass. The ratio of the number of nitrogen atoms to the number of carbon atoms ($N_N/N_C$) was 0.24. The ratio of the number of hydrogen atoms to the number of carbon atoms ($N_H/N_C$) was 0.33.

Comparative Example 3

12 g of the melamine resin prepared as described above was sampled and filled in a quartz tube having an inner diameter of 25 mm. The temperature of this melamine resin was elevated to 1000° C. over 70 minutes in a nitrogen gas flow of 300 Ncc/min under atmospheric pressure, and held at 1000° C. for 1 hour for heat-treatment to obtain 1.0 g of a nitrogen-containing carbon material. The yield of the nitrogen-containing carbon material for the melamine resin was 8%. The oxygen concentration in the nitrogen gas used was found to be 1 ppm as a result of measurement using a trace oxygen analyzer (306WA-type, manufactured by Teledyne Analytical Instruments).

<Analysis of Nitrogen-Containing Carbon Material>
(Result of CHN Analysis)

The resulting nitrogen-containing carbon material was found to have a carbon atom content of 78.2% by mass, a nitrogen atom content of 7.8% by mass and a hydrogen atom content of 1.5% by mass. The ratio of the number of nitrogen atoms to the number of carbon atoms ($N_N/N_C$) was 0.086. The ratio of the number of hydrogen atoms to the number of carbon atoms ($N_H/N_C$) was 0.23.

Comparative Example 4

The melamine resin prepared as described above was subjected to a heat-treatment at 250° C. in the air for 1 hour to obtain 250° C.-heat treatment product.

12 g of the 250° C.-heat treatment product obtained as above was sampled and filled in a quartz tube having an inner diameter of 25 mm. The temperature of this 250° C.-heat treatment product was elevated to 1000° C. over 70 minutes in a nitrogen gas flow of 300 Ncc/min under atmospheric pressure, and held at 1000° C. for 1 hour for heat-treatment to obtain 1.0 g of a nitrogen-containing carbon material. The yield of the nitrogen-containing carbon material for the heat treatment product mentioned above was 8%. The oxygen concentration in the nitrogen gas used was found to be 1 ppm as a result of measurement using a trace oxygen analyzer (306WA-type, manufactured by Teledyne Analytical Instruments).

<Analysis of Nitrogen-Containing Carbon Material>
(Result of CHN Analysis)

The resulting nitrogen-containing carbon material was found to have a carbon atom content of 78.5% by mass, a nitrogen atom content of 7.9% by mass and a hydrogen atom content of 1.5% by mass. The ratio of the number of nitrogen atoms to the number of carbon atoms ($N_N/N_C$) was 0.086. The ratio of the number of hydrogen atoms to the number of carbon atoms ($N_H/N_C$) was 0.23.

Comparative Example 5

12 g of the azulmic acid prepared in the above Preparation Example was sampled and filled in a quartz tube having an inner diameter of 25 mm. The temperature of this azulmic acid was elevated to 600° C. over 40 minutes in a nitrogen gas flow of 300 Ncc/min under atmospheric pressure, and held at 600° C. for 1 hour for carbonization treatment to obtain 6.8 g of a nitrogen-containing carbon material. The yield of the nitrogen-containing carbon material for the azulmic acid was 57%. The oxygen concentration in the nitrogen gas used was found to be 1 ppm as a result of measurement using a trace oxygen analyzer (306WA-type, manufactured by Teledyne Analytical Instruments).

<Analysis of Nitrogen-Containing Carbon Material>
(Result of CHN Analysis)

The resulting nitrogen-containing carbon material was found to have a carbon atom content of 56.6% by mass, a nitrogen atom content of 32.1% by mass and a hydrogen atom content of 2.1% by mass. The ratio of the number of nitrogen atoms to the number of carbon atoms ($N_N/N_C$) was 0.49. The ratio of the number of hydrogen atoms to the number of carbon atoms ($N_H/N_C$) was 0.45.

Comparative Example 6

12 g of the azulmic acid prepared in the above Preparation Example was sampled and filled in a quartz tube having an inner diameter of 25 mm. The temperature of this azulmic acid was elevated to 800° C. over 50 minutes in a nitrogen gas flow of 300 Ncc/min under atmospheric pressure, and held at 800° C. for 1 hour for carbonization treatment to obtain 4.4 g of a nitrogen-containing carbon material. The yield of the nitrogen-containing carbon material for the azulmic acid was 37%. The oxygen concentration in the nitrogen gas used was found to be 1 ppm as a result of measurement using a trace oxygen analyzer (306WA-type, manufactured by Teledyne Analytical Instruments).

<Analysis of Nitrogen-Containing Carbon Material>
(Result of CHN Analysis)

The resulting nitrogen-containing carbon material was found to have a carbon atom content of 68.6% by mass, a nitrogen atom content of 24.0% by mass and a hydrogen atom content of 1.8% by mass. The ratio of the number of nitrogen atoms to the number of carbon atoms ($N_N/N_C$) was 0.30. The ratio of the number of hydrogen atoms to the number of carbon atoms ($N_H/N_C$) was 0.31.

Comparative Example 7

12 g of the azulmic acid prepared in the above Preparation Example was sampled and filled in a quartz tube having an inner diameter of 25 mm. The temperature of this azulmic acid was elevated to 1000° C. over 70 minutes in a nitrogen gas flow of 300 Ncc/min under atmospheric pressure, and held at 1000° C. for 1 hour for carbonization treatment to obtain 3.4 g of a nitrogen-containing carbon material. The yield of the nitrogen-containing carbon material for the azulmic acid was 28%. The oxygen concentration in the nitrogen gas used was found to be 1 ppm as a result of measurement using a trace oxygen analyzer (306WA-type, manufactured by Teledyne Analytical Instruments).

<Analysis of Nitrogen-Containing Carbon Material>
(Result of CHN Analysis)

The resulting nitrogen-containing carbon material was found to have a carbon atom content of 89.2% by mass, a nitrogen atom content of 8.7% by mass and a hydrogen atom content of 0.8% by mass. The ratio of the number of nitrogen atoms to the number of carbon atoms ($N_N/N_C$) was 0.085. The ratio of the number of hydrogen atoms to the number of carbon atoms ($N_H/N_C$) was 0.10.

The above results are shown in FIG. 2. FIG. 2 is a plotted graph in which the results of the above Examples and Comparative Examples are plotted with ($N_H/N_C$) on the horizontal axis and ($N_N/N_C$) on the longitudinal axis. FIG. 2 proves that the nitrogen-containing carbon material produced by the present invention has a high nitrogen content even though the hydrogen content is lowered.

The above results are summarized in Table 1.

TABLE 1

| | | Heat treatment | | Results of CHN analysis | | | | | |
| | | In oxygen- | | Mass ratio (% by mass) | | | | Ratio of number of atoms | |
| | raw material for carbon | containing gas atmosphere | In inert gas atmosphere | C | N | H | Total | $N_N/N_C$ | $N_H/N_C$ |
| Example 1 | Azulmic acid | 330° C. 1 hr | 600° C. 1 hr | 55.0 | 39.0 | 2.1 | 96.1 | 0.61 | 0.46 |
| Example 2 | Azulmic acid | 330° C. 1 hr | 800° C. 1 hr | 67.1 | 28.0 | 1.7 | 96.8 | 0.36 | 0.30 |

TABLE 1-continued

| | raw material for carbon | Heat treatment | | Results of CHN analysis | | | | | |
|---|---|---|---|---|---|---|---|---|---|
| | | In oxygen-containing gas atmosphere | In inert gas atmosphere | Mass ratio (% by mass) | | | | Ratio of number of atoms | |
| | | | | C | N | H | Total | $N_N/N_C$ | $N_H/N_C$ |
| Example 3 | Azulmic acid | 250° C. 5 hr | 1000° C. 1 hr | 85.0 | 14.0 | 0.7 | 99.7 | 0.14 | 0.10 |
| Comparative Example 1 | Melamine resin | — | 800° C. 1 hr | 68.2 | 17.9 | 1.9 | 88.0 | 0.22 | 0.33 |
| Comparative Example 2 | Melamine resin | 330° C. 1 hr | 800° C. 1 hr | 69.0 | 19.0 | 1.9 | 89.9 | 0.24 | 0.33 |
| Comparative Example 3 | Melamine resin | — | 1000° C. 1 hr | 78.2 | 7.8 | 1.5 | 87.5 | 0.086 | 0.23 |
| Comparative Example 4 | Melamine resin | 250° C. 5 hr | 1000° C. 1 hr | 78.5 | 7.9 | 1.5 | 87.9 | 0.086 | 0.23 |
| Comparative Example 5 | Azulmic acid | — | 600° C. 1 hr | 56.6 | 32.1 | 2.1 | 90.8 | 0.49 | 0.45 |
| Comparative Example 6 | Azulmic acid | — | 800° C. 1 hr | 68.6 | 24.0 | 1.8 | 94.4 | 0.30 | 0.31 |
| Comparative Example 7 | Azulmic acid | — | 1000° C. 1 hr | 89.2 | 8.7 | 0.8 | 98.7 | 0.085 | 0.10 |

INDUSTRIAL APPLICABILITY

The process according to the present invention can save resources and energy and is also useful as a process for producing a nitrogen-containing carbon material which satisfies a high nitrogen content and a low hydrogen content.

More specifically, the process according to the best mode of the present invention includes a step of polymerizing a raw material containing hydrogen cyanide in step S10 and steps (step S12, S14) of subjecting azulmic acid produced in step S10 to a heat treatment under various conditions.

Hydrogen cyanide used in step S10 is a direct derivative from a basic chemical raw material and is also a by-product in the production of a monomer and the like. Therefore, the process for producing azulmic acid from hydrogen cyanide means a process for producing a precursor of a nitrogen-containing carbon material with reduced energy consumption and reduced resource consumption. Furthermore, since hydrogen cyanide can be easily polymerized, its polymerization steps are simple, and since the resulting polymer is in the form of powder, it offers good handling properties and does not require steps for preparing powder, such as crushing steps. Moreover, polymers of hydrogen cyanide which have not been utilized are to be effectively used.

Also, as the recovery rate of carbide in step S14 is high, the process for producing a nitrogen-containing carbon material consumes less energy and fewer resources.

According to the present embodiment, the process consumes less energy and fewer resources in step S10, S12 and S14, and the total consumption of energy and resources throughout the process is extremely low compared to that of conventional methods.

Also, the nitrogen-containing carbon material produced by the process of the present invention has a high nitrogen atom content and a low hydrogen atom content. The nitrogen-containing carbon material is useful in applications requiring such characteristics, for example, electronic material applications such as hydrogen storage materials, negative electrodes of lithium ion secondary batteries and electrodes for capacitors.

As an example, the nitrogen-containing carbon material prepared in Example 2 was measured for the hydrogen storage ability.

The hydrogen storage and hydrogen release were measured as follows according to the method of measuring PCT characteristics of hydrogen storage alloys defined in JIS-H7201. 0.5 g of the resulting nitrogen-containing carbon material was subjected to vacuum deaeration at 300° C. for 3 hours. Subsequently, after cooling the material to 30° C., the hydrogen storage ability was measured under the condition of 30° C. The equilibrium pressure was increased from 0 MPa to 11.5 MPa to allow hydrogen to be stored (hydrogen storing step). Then the equilibrium pressure was lowered from 11.5 MPa to 0.1 MPa to release hydrogen (hydrogen releasing step). 0.65% by mass of hydrogen was stored in the hydrogen storing step and 0.65% by mass of hydrogen was released in the hydrogen releasing step, demonstrating a high hydrogen storage ability with good reversibility.

The invention claimed is:

1. A process for producing a nitrogen-containing carbon material, comprising a first step of subjecting azulmic acid to a first heat treatment in an oxygen-containing gas atmosphere, thereby preparing a heat-treated product, and a second step of subjecting said heat-treated product to a second heat treatment in an inert gas atmosphere.

2. A process for producing a nitrogen-containing carbon material according to claim 1, wherein said first heat treatment is carried out at 170 to 600° C.

3. A nitrogen-containing carbon material produced by the process according to claim 2, comprising a carbon atom, a hydrogen atom and a nitrogen atom.

4. A nitrogen-containing carbon material according to claim 3, wherein the nitrogen atom, the carbon atom and the hydrogen atom satisfy the conditions represented by the following formulas (I) and (II):

$$(N_N/N_C) > 1.209 \times (N_H/N_C) - 0.0346 \quad (I)$$

$$(N_N/N_C) > 0.04 \quad (II)$$

wherein $N_N$, $N_C$ and $N_H$ each represent the number of the nitrogen atoms, the carbon atoms and the hydrogen atoms.

5. A nitrogen-containing carbon material produced by the process according to claim 1, comprising a carbon atom, a hydrogen atom and a nitrogen atom.

6. A nitrogen-containing carbon material according to claim 5, wherein the nitrogen atom, the carbon atom and the hydrogen atom satisfy the conditions represented by the following formulas (I) and (II):

$$(N_N/N_C) > 1.209 \times (N_H/N_C) - 0.0346 \quad (I)$$

$$(N_N/N_C) > 0.04 \quad (II)$$

wherein $N_N$, $N_C$ and $N_H$ each represent the number of the nitrogen atoms, the carbon atoms and the hydrogen atoms.

* * * * *